United States Patent
Mizukawa (10) Patent No.: US 10,753,448 B2
(45) Date of Patent: Aug. 25, 2020

(54) TRANSAXLE

(71) Applicant: Kanzaki Kokyukoki Mfg. Co., Ltd., Amagasaki-shi, Hyogo (JP)

(72) Inventor: Katsumoto Mizukawa, Morristown, TN (US)

(73) Assignee: KANZAKI KOKYUKOKI MFG. CO., LTD., Amagasaki-shi, Hyogo (JP)

( * ) Notice: Subject to any disclaimer, the term of this patent is extended or adjusted under 35 U.S.C. 154(b) by 112 days.

(21) Appl. No.: 16/000,143

(22) Filed: Jun. 5, 2018

(65) Prior Publication Data

US 2018/0283517 A1   Oct. 4, 2018

Related U.S. Application Data (63) Continuation of application No. 15/471,863, filed on Mar. 28, 2017, now Pat. No. 10,012,301.

(60) Provisional application No. 62/314,767, filed on Mar. 29, 2016.

(51) Int. Cl.
| | |
|---|---|
| F16H 48/24 | (2006.01) |
| F16H 57/04 | (2010.01) |
| F16H 48/08 | (2006.01) |
| F16H 48/20 | (2012.01) |

(52) U.S. Cl.
CPC .......... *F16H 48/24* (2013.01); *F16H 57/045* (2013.01); *F16H 48/08* (2013.01); *F16H 48/20* (2013.01); *F16H 57/0452* (2013.01); *F16H 57/0483* (2013.01)

(58) Field of Classification Search
CPC .......... F16H 48/24; F16H 48/08; F16H 48/20; F16H 57/045; F16H 57/0452; F16H 57/0483

USPC .......... 475/231, 237, 160; 184/6.12
See application file for complete search history.

(56) References Cited

U.S. PATENT DOCUMENTS

| | | | |
|---|---|---|---|
| 2,424,942 A | 7/1947 | Mynssen | |
| 5,125,291 A * | 6/1992 | Makita | B60K 17/105 475/83 |
| 5,259,194 A * | 11/1993 | Okada | B60K 17/14 475/83 |
| 5,423,182 A * | 6/1995 | Hauser | B60K 17/105 60/487 |
| 5,555,727 A * | 9/1996 | Hauser | B60K 17/105 60/455 |
| 6,007,449 A | 12/1999 | Okada et al. | |
| 6,413,181 B2 | 7/2002 | Okada | |
| 2003/0205046 A1* | 11/2003 | Shimizu | B60K 17/105 60/487 |
| 2018/0149261 A1* | 5/2018 | Creech | F16H 57/0435 |

* cited by examiner

*Primary Examiner* — Roger L Pang
(74) *Attorney, Agent, or Firm* — Sterne, Kessler, Goldstein & Fox P.L.L.C.

(57) ABSTRACT

In a transaxle, the transaxle includes a hydrostatic continuously variable transmission, at least one axle, a gear train for drivingly connecting the hydrostatic continuously variable transmission and the axle, a housing accommodating the hydrostatic continuously variable transmission, the axle, the gear train and storing an oil therein, and a reservoir tank connected to the housing so that the oil in the housing can be moved back and forth. The reservoir tank has a rectangular parallelepiped shape and is disposed on a side of a final reduction bull gear included in the gear train and above the axle along an axis direction of the axle.

11 Claims, 5 Drawing Sheets

TRANSAXLE

CROSS-REFERENCE TO RELATED APPLICATIONS

The present application claims the benefit of priority under 35 U.S.C. § 119(e) based on U.S. Provisional Application Ser. No. 62/314,767 filed on Mar. 29, 2016, the entire content of which is also incorporated herein by reference. Further, this application is a continuation of U.S. patent application Ser. No. 15/471,863, filed on Mar. 28, 2017.

FIELD

At least one embodiment of the present invention relates to a differential locking mechanism, especially, for a differential gear unit in a transaxle.

BACKGROUND

As disclosed by U.S. Pat. No. 6,007,449 A, there is a well-known conventional transaxle. This transaxle includes a transaxle casing incorporating a hydrostatic transmission ("HST"), a differential gear unit, right and left axles differentially rotatably connected to each other by the differential gear unit, and a reduction gear train for transmitting power from the HST to the differential gear unit. When the interior of the transaxle casing is viewed in plan, the right and left axles are extended rightward and leftward distally from the differential gear unit, the reduction gear train is extended from the differential gear unit perpendicular to the axial direction of the axles, and the HST is disposed in a substantially rectangular HST chamber. If the reduction gear train is assumed to extend forward from the differential gear unit, the reduction gear train defines a left side of the HST chamber, and the right axle defines a rear side of the HST chamber. Therefore, a corner of the HST chamber between the left side and the rear side is adjacent to the differential gear unit.

The differential gear unit constitutes a conventional differential locking mechanism including a thrust collar and a shifter. The thrust collar is fitted on one of the right and left axles so as to be unmovable axially along the axle. The shifter is fitted on the thrust collar slidably along the thrust collar in the axial direction of the axle. Locking pins are extended from the shifter parallel to the axle so as to constantly pierce a differential side gear fixed on the axle. The locking pins are further inserted into respective recesses formed in a bull gear of the differential gear unit so as to lock the right and left axles to each other via the bull gear only when the shifter slides along the thrust collar toward the differential side gear for the purpose of differential locking of the axles. Normally, the shifter is located so as not to insert the locking pins into the recess formed in the bull gear, thereby allowing the right and left axles to rotate differentially.

In the conventional differential locking mechanism, the thrust collar and the shifter are disposed on a distal side of the differential side gear in the axial direction of the axle. In this regard, the above disclosed transaxle is comparatively large-sized, so that the rear side of the HST chamber is spaced forward from the right axle. Therefore, the space between the rear side of the HST chamber and the right axle is used for locating the thrust collar and the shifter, so that the thrust collar with the shifter thereon is provided on the right axle. However, if the transaxle is small-sized, there may be no space between the rear side of the HST chamber and the right axle for locating the thrust collar and the shifter. Further, if the thrust collar with the shifter thereon is provided on the left axle, a portion of the transaxle casing supporting the left axle on the leftward distal side of a differential side gear on the left axle may have to be modified to expand leftward to incorporate the thrust collar and the shifter, thereby conflicting with the demand for minimizing the transaxle, and thereby increasing costs. Therefore, to ensure a small-sized transaxle, it is desired that a differential locking mechanism is minimized, especially, in an axial direction of axles.

SUMMARY

A differential locking mechanism according to an embodiment is minimized for realizing a small-sized apparatus, e.g., a transaxle, incorporating a differential gear unit constituting the differential locking mechanism.

A differential locking mechanism according to the embodiment comprises first and second axles, first and second differential side gears, a bull gear, a differential pinion, a cylindrical part, and a differential locking slider. The first and second axles are extended coaxially to each other. The first differential side gear is fixed on the first axle. The second differential side gear is fixed on the second axle. The bull gear is disposed between the first and second side gears. The bull gear includes an axial center hole and an engagement part radially outward from the axial center hole. Axial proximal ends of the first and second axles are fitted in the axial center hole so as to face each other so that the first and second axles are rotatable relative to each other and to the bull gear. The differential pinion is pivoted in the bull gear and meshes at opposite sides thereof with the first and second differential side gears. The cylindrical part is provided on the first differential side gear unrotatably relative to the first differential side gear. The cylindrical part includes a circumferential portion surrounding the first differential side gear. The differential locking slider is fitted on the circumferential portion of the cylindrical part unrotatably relative to the cylindrical part. The differential locking slider includes an engagement part. The differential locking slider is slidable along the circumferential portion of the cylindrical part in one axial direction of the first and second axles so as to engage the engagement part of the differential locking slider with the engagement part of the bull gear, and in another axial direction of the first and second axles so as to disengage the engagement part of the differential locking slider from the engagement part of the bull gear.

Therefore, the cylindrical part and the differential locking slider are not located on a distal side of the first differential side gear in the axial direction of the first and second axles, but are located radially outward from the first differential side gear so as to surround the first differential side gear. Therefore, the differential locking mechanism is advantageously minimized in the axial direction of the first and second axles. In a case where the transaxle, having the above-mentioned arrangement of the HST, the reduction gear train, the axles and the differential gear unit, is provided with the present differential locking mechanism, the transaxle does not need expansion of the transaxle casing. More specifically, if the first axle having the first differential side gear thereon is the right axle of the above-mentioned transaxle, the HST can be disposed extremely adjacent to the right axle with no space along the right axle on the distal rightward side of the right differential side gear for arranging the thrust collar and the shifter, thereby achieving the desired small-sized transaxle. If the first axle having the first differential side gear thereon is the left axle of the above-mentioned transaxle, the portion of the transaxle casing supporting the left axle on the distal leftward side of the left differential side gear does not need expand leftward to incorporate the thrust collar and the shifter, thereby ensuring the minimized shape of the transaxle casing.

Preferably, the cylindrical part is formed integrally with the first differential side gear. Therefore, the number of component parts is reduced so as to facilitate assembling the differential locking mechanism.

Further preferably, the first differential side gear formed with the cylindrical part is made of steel, and the second differential side gear and the differential pinion are made of powder metal. Therefore, the cylindrical part made of steel has a sufficient strength for supporting the differential locking slider thereon while keeping the powder metal as economic material for making the second differential side gear and the differential pinion.

Alternatively, preferably, the cylindrical part is a member separated from the first differential side gear. Therefore, a common differential side gear can be used as either the first or second differential side gear, thereby promoting standardization of component parts, and thereby reducing costs.

Further preferably, the cylindrical part is made of steel, and the first and second differential side gears and the differential pinion are made of powder metal. Therefore, only the cylindrical part is made of steel so as to ensure a sufficient strength for supporting the differential locking slider thereon, while the number of parts made of the economic powder metal is increased so as to reduce costs.

These and other objects, features and advantages of the embodiments will appear more fully from the following detailed description of the invention with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Referring to FIGS. 1 to 4, a general structure of a transaxle 1 will be described. Transaxle 1 includes a transaxle casing 10. Transaxle casing 10 includes an upper housing 11 and a lower housing 12 joined to each other. Upper housing 11 is formed with a center portion 11a, a right axle support portion 11b extended rightward from center portion 11a, and a left axle support portion 11c extended leftward from center portion 11a. Lower housing 12 is joined at a horizontal top surface thereof to a horizontal bottom surface of center portion 11a of upper housing 11 between right and left axle support portions 11b and 11c, and center portion 11a of upper housing 11 and lower housing 12 are fastened together by bolts 13, thereby constituting transaxle casing 10.

Center portion 11a of upper housing 11 and lower housing 12 joined to each other form an HST chamber 10a and a gear chamber 10b therein. An HST 3 is disposed in HST chamber 10a. A reduction gear train 4 and a differential gear unit 5 are disposed in gear chamber 10b. Hereinafter, description will be based on an assumption that transaxle 1 is located so that a portion of gear chamber 10b incorporating reduction gear train 4 is extended along a left side of HST chamber 10a and forward from a rear portion of gear chamber 10b incorporating differential gear unit 5.

Transaxle 1 carrying right and left axles 2R and 2L is configured so that HST 3 receives power from the outside of transaxle 1 and outputs the power to right and left axles 2R and 2L via reduction gear train 4 and differential gear unit 5. Right axle 2R is extended through right axle support portion 11b, and is journalled by a bearing (not shown) in a distal right end portion (not shown) of right axle support portion 11b. Left axle 2L is extended through left axle support portion 11c, and is journalled by a bush (or needle bearing) 23 in a distal left end portion of left axle support portion 11c. Proximal end portions of respective right and left axles 2R and 2L are disposed in the rear portion of gear chamber 10b. More specifically, the proximal end portions of right and left axles 2R and 2L are fitted into an axial center hole 51a of a later-discussed bull gear 51 of differential gear unit 5 so as to face each other in axial center hole 51a. Right axle 2R is extended rightward from a later-discussed gear assembly of differential gear unit 5 so that right axle 2R is disposed rearward from a rear side of HST chamber 10a, and is extend laterally along the rear side of HST chamber 10a.

Figure 1:
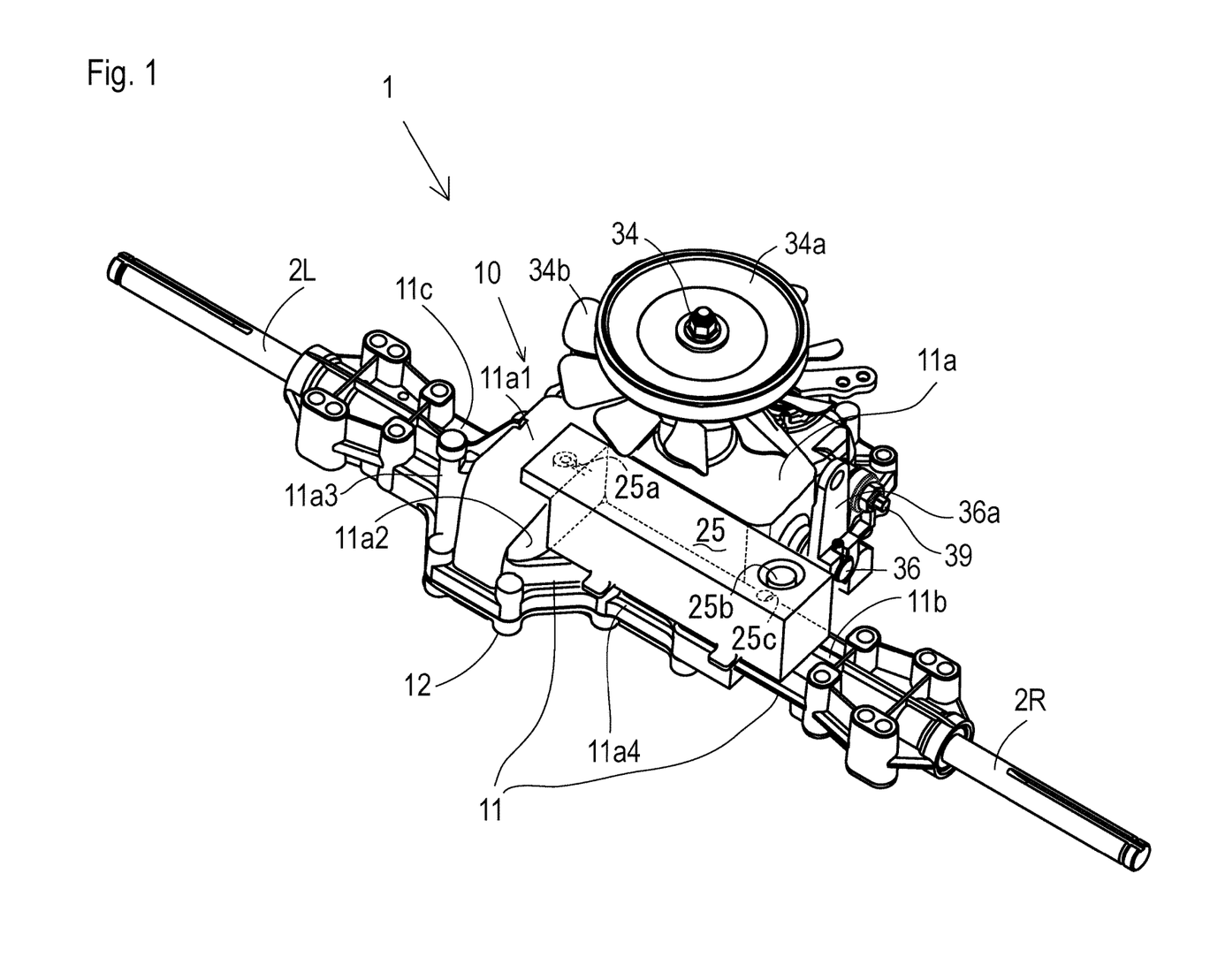
FIG. 1 is a perspective view of a transaxle.

HST 3 includes a center section 31, an axial piston type hydraulic pump 32 mounted on center section 31, and an axial piston type hydraulic motor 33 mounted on center section 31. Center section 31 is extended at a right end thereof along a right side of HST chamber 10a so as to have its front end adjacent to a front side of HST chamber 10a, and its rear end adjacent to the rear end of HST chamber 10a. Center section 31 is formed at a rear half portion thereof with a horizontal surface, on which hydraulic pump 32 is mounted so as to extend upward from the rear half portion of center section 31. A vertical pump shaft 34 serving as a rotary axis of hydraulic pump 32 (i.e., an input shaft of HST 3) is journalled at a lower portion thereof in the rear half portion of center section 31, and is extended upward so as to have a top portion thereof projecting upward from a top of center portion 11a of upper housing 11 of transaxle casing 10. An input pulley 34a and a cooling fan 34b are fixed on the top portion of pump shaft 34, as shown in FIG. 1. Input pulley 34a is drivingly connected to a prime mover, e.g., an internal combustion engine, via a belt (not shown) looped over input pulley 34a.

Center section 31 is formed at a front half portion thereof with a vertical surface, on which hydraulic motor 33 is mounted so as to extend leftward from the front half portion of center section 31. A lateral horizontal motor shaft 35 serving as a rotary axis of hydraulic motor 33 (i.e., an output shaft of HST 3) is journalled at a right portion thereof in the front half portion of center section 31, and is extended leftward so as to have a left end portion thereof projecting into the front portion of gear chamber 10b through a partition wall formed in transaxle casing 10 to define the left side of HST chamber 10a.

Center section 31 is formed therein with fluid passages (not shown) fluidly connecting hydraulic pump 32 to hydraulic motor 33. Hydraulic pump 32 includes a movable swash plate (not shown) for controlling an amount of fluid delivered from hydraulic pump 32 and a flow direction of fluid delivered from hydraulic pump 32, thereby controlling rotational speed and direction of motor shaft 35 of hydraulic motor 33. A lateral horizontal pump control shaft 36 is pivotally supported by a right side wall of center portion 11a of upper housing 11 of transaxle casing 10 defining the right side of HST chamber 10a. In HST chamber 10a, an inner end of pump control shaft 36 is interlockingly connected to the movable swash plate. Outside of transaxle casing 10, an arm 36a is fixed on an outer end of pump control shaft 36 so as to be operatively connected to a speed control manipulator (e.g., a lever or a pedal) provided in a vehicle, for instance.

In HST chamber 10a, a neutral returning spring 37 is coiled around pump control shaft 36. A spring expansion arm 38 is fixed on pump control shaft 36, and is extended along the right side of HST chamber 10a. A pressure pin 38a is extended laterally horizontally from spring expansion arm 38. A laterally horizontal spring retaining pin 39 is supported by the right side wall of center portion 11a of upper housing 11 forward from pump control shaft 36. In HST chamber 10a, both ends of neutral returning spring 37 are twisted so as to cross each other, and are extended so as to nip pressure pin 38a and spring retaining pin 39 therebetween at a rotational position of pump control shaft 36 corresponding to a neutral position of the movable swash plate.

If pump control shaft 36 is rotated from the rotational position corresponding to the neutral position of the movable swash plate, pressure pin 38a of spring expansion arm 38 rotates together with pump control shaft 36 so as to push one end portion of neutral returning spring 37 away from another end portion of neutral returning spring 37 retained by spring retaining pin 39, thereby generating a spring force of neutral returning spring 37 to bias pump control shaft 36 to the rotational position corresponding to the neutral position of the movable swash plate. Incidentally, spring retaining pin 39 is an eccentric pin configured so that the rotational position of pump control shaft 36 defined by pressure pin 38a and spring retaining pin 39 nipped by neutral returning spring 37 can be adjusted by rotating spring retaining pin 39 so as to accurately match with the neutral position of the movable swash plate.

Reduction gear train 4 disposed in gear chamber 10b includes a motor output gear 41, a counter shaft 42, a large diametric counter gear 43, a small diametric counter gear 44, and bull gear 51 that also serves as an input gear of differential gear unit 5. Motor output gear 41 is fixed on the left end portion of motor shaft 35 in gear chamber 10b. Counter shaft 42 is extended laterally horizontally and is disposed in gear chamber 10b between motor shaft 35 forward therefrom and differential gear unit 5 rearward therefrom. Small diametric counter gear 44 is fitted on counter shaft 42 so as to extend along counter shaft 42 between right and left sides of a fore-and-aft intermediate portion of gear chamber 10b, and meshes at a rear end thereof with bull gear 51. Large diametric counter gear 43 is fixed on small diametric counter gear 44 and meshes at a front end thereof with motor output gear 41. Therefore, reduction gear train 4 is configured so as to transmit power from motor shaft 35 to bull gear 51 of differential gear unit 5 via motor output gear 41, large diametric counter gear 43 and small diametric counter gear 44.

Further, a spacer ring 45 is provided around small diametric counter gear 44 between large diametric counter gear 43 and bull gear 51 so as to ensure a space rearward therefrom between large diametric counter gear 43 and bull gear 51. A later-discussed differential locking mechanism 6 includes a cylindrical part 61 and a differential locking slider 62 axially slidably fitted on cylindrical part 61, which are passed through the space rearward from spacer ring 45 between large diametric counter gear 43 and bull gear 51. Therefore, this space is used for arranging cylindrical part 61 and differential locking slider 62 around a left differential side gear of differential gear unit 5 serving as a later-discussed first differential side gear 53, thereby being advantageous to constitute differential locking mechanism 6.

A brake 7 for braking motor shaft 35 is disposed in a front end portion of gear chamber 10b. In this regard, motor output gear 41 is formed with a flange serving as a brake disc 41a. Brake 7 includes a vertical camshaft 71, a brake shoe 72, and a brake pad 73. Camshaft 71 is pivotally supported by transaxle casing 10 and is formed with a sectionally semicircular portion having a vertical cam surface 71a in gear chamber 10b. Cam surface 71a faces brake shoe 72 disposed between camshaft 71 and a front end portion of brake disc 41a. Brake pad 73 is fitted to a wall of transaxle casing 10 so that the front end portion of brake disc 41a is disposed between bake shoe 72 and brake pad 73. Normally, camshaft 71 is rotationally located so as to extend cam surface 71a parallel to brake shoe 72, thereby separating brake disc 41a from brake shoe 72 and bake pad 73 so as to keep rotation of motor shaft 35 freely from brake 7. When brake 7 is applied, camshaft 71 is rotated to locate cam surface 71a slantwise relative to brake shoe 72 so as to thrust brake shoe 72, whereby brake disc 41a is pressed between brake shoe 72 and brake pad 73, thereby braking motor shaft 35 and axles 2R and 2L drivingly connected to motor shaft 35 via reduction gear train 4 and differential gear unit 5.

Differential gear unit 5 and differential locking mechanism 6 will be described with reference to FIGS. 2 to 4. Differential gear unit 5 includes bull gear 51, differential pinions 52, a first differential side gear 53, a second differential side gear 54, and right and left axles 2R and 2L. Differential locking mechanism 6 is defined as differential gear unit 5 plus a cylindrical part 61, a differential locking slider 62, a fork 63, a fork shaft 64, a spring 65, a stopper ring 66, and a differential locking arm 67. In other words, differential locking mechanism 6 is configured so as to use these additional members 61, 62, 63, 64, 65, 66 and 67 for locking right and left axles 2R and 2L together so as to prevent right and left axles 2R and 2L from differentially rotating.

Bull gear 51 serving as an input gear of differential gear unit 5 meshes with small diametric counter gear 44 so as to also constitute reduction gear train 4. Bull gear 51 is bored through with lateral axial center hole 51a. As mentioned above, the axially proximal end portions of right and left axles 2R and 2L (i.e., a left end portion of right axle 2R and a right end portion of left axle 2L) are fitted into axial center hole 51a in bull gear 51 so as to face each other, so that right and left axles 2R and 2L also serve as output shafts of differential gear unit 5. Therefore, when bull gear 51 is rotated by power from motor shaft 35 via reduction gear train 4, right and left axles 2R and 2L rotate together with bull gear 51, however, right and left axles 2R and 2L are allowed to rotate relative to each other and to bull gear 51.

Bull gear 51 is formed therein with a pair of pinion holes 51b symmetrically with respect to axial center hole 51a. A pair of bevel pinions serving as differential pinions 52 are disposed in symmetric pinion holes 51b, respectively. Each differential pinion 52 has a pivot shaft 52a extended in a radial direction of bull gear 51. As a result, pivot shafts 52a of respective differential pinions 52 are disposed coaxially to each other with axial center hole 51a therebetween, and symmetric differential pinions 52 are pivoted in bull gear 51 via respective pivot shafts 52a.

A bevel gear serving as first differential side gear 53 is fixed on one of axles 2R and 2L, and another bevel gear serving as second differential side gear 54 is fixed on the other of axles 2R and 2L, so that first and second differential side gears 53 and 54 adjoin bull gear 51 therebetween. Therefore, each of differential pinions 52 meshes at right and left sides thereof with first and second differential side gears 53 and 54. First differential side gear 53 is defined as a gear provided with cylindrical part 61 for constituting differential locking mechanism 6, while second differential side gear 54 is defined as a gear that is not provided with cylindrical part 61. In this embodiment, first differential side gear 53 is a left differential side gear fixed on left axle 2L adjacent to a left end surface of bull gear 51, and second differential side gear 54 is a right differential side gear fixed on right axle 2R adjacent to a right end surface of bull gear 51.

Cylindrical part 61 includes a vertical plate portion 61a at an axially distal end (in this embodiment, a left end) thereof joined to an axially distal end (in this embodiment, a left end) of first differential side gear 53 so as to be provided on first differential side gear 53 unrotatably relative to first differential side gear 53. Cylindrical part 61 includes a circumferential portion 61b extended in the axial direction of axles 2L and 2R from an outer circumferential end of vertical plate portion 61a toward bull gear 51 so as to surround first differential side gear 53. Differential locking slider 62 is spline-fitted on circumferential portion 61b of cylindrical part 61 unrotatably relative to cylindrical part 61 and slidably in the axial direction parallel to axles 2L and 2R. Differential locking slider 62 is formed at an axial proximal end (in this embodiment, a right end) thereof with pawls 62a as a typical form of a projection.

Bull gear 51 is formed therein with slots 51c corresponding to respective pawls 61a of differential locking slider 62. Slots 51c are a typical form of a recess for receiving the projection of differential locking slider 62. To ensure a proper function as differential locking mechanism 6, slot 51c may be open at only the left end surface of bull gear 51 facing differential locking slider 62, and may be closed at the right end surface of bull gear 51 opposite differential locking slider 62. However, in this embodiment, slots 51c are laterally extended to penetrate bull gear 51 so as to be also open at the right end surface of bull gear 51 opposite differential locking slider 62. Slot 51c penetrating bull gear 51 is advantageous so that common bull gear 51 can be used without reversing whether the right differential side gear or the left differential side gear may serve as first differential side gear 53 provided with cylindrical part 61 having differential locking slider 62 fitted thereon.

Differential locking slider 62 is slidable in a differential locking direction (in this embodiment, rightward) toward bull gear 51 so as to insert pawls 62a into respective slots 51c in bull gear 51, and in a differential unlocking direction (in this embodiment, leftward) away from bull gear 51 so as to remove pawls 62a from respective slots 51c.

Alternatively, bull gear 51 may include a projection such as pawls, and differential locking slider 62 may include a recess for receiving the projection, such as slots. The only requirement for bull gear 51 and differential locking slider 62 is that bull gear 51 and differential locking slider 62 include respective engagement parts, and differential locking slider 62 is slidable in one (in the present embodiment, rightward) axial direction of axles 2R and 2L so as to engage its engagement part with the engagement part of bull gear 51, and in another (in the present embodiment, leftward) axial direction of axles 2R and 2L so as to disengage its engagement part from the engagement part of bull gear 51.

Differential locking slider 62 is formed with an annular fork groove 62b into which fork 63 is fitted. Fork 63 is formed with a boss 63a, which is fitted on fork shaft 64 rotatably relative to fork shaft 64 and axially slidably along fork shaft 64. Fork shaft 64 is extended laterally horizontally (parallel to axles 2R and 2L) and is pivotally supported by a rear lower portion of lower housing 12 unmovably in the axial direction. In this regard, lower housing 12 is formed with right and left vertical walls 12a and 12b defined as right and left sides of the rear portion of gear chamber 10b incorporating differential gear unit 5. Fork shaft 64 is journalled by right and left vertical walls 12a and 12b of lower housing 12. The distal left end of cylindrical part 61 joined to first differential side gear 53 serving as the left differential side gear, and fork 63 are extended along left vertical wall 12b of lower housing 12. Stopper ring 66 is provided on fork shaft 64 between boss 63a of fork 63 and right vertical wall 12a of lower housing 12. Spring 65 is wound around fork shaft 64 and stopper ring 66, and is interposed between boss 63a of fork 63 and right vertical wall 12a of lower housing 12 along which a distal right end of second differential side gear 54 serving as the right differential side gear is disposed.

In gear chamber 10b, a pressure pin 64a projects radially from fork shaft 64. Boss 63a of fork 63 is formed with a cam groove 63b having a leftwardly open V-shaped edge. One axial (in this embodiment, left) end portion of fork shaft 64 projects outward from right or left vertical wall 12a or 12b (in this embodiment, left vertical wall 12b) so as to be fixedly provided thereon with differential locking arm 67. Differential locking arm 67 is operatively connected to a differential locking manipulator (e.g., a lever or a pedal) in a vehicle, for instance.

Normally, differential locking arm 67 and fork shaft 64 are rotationally located so that pressure pin 64a is disposed in cam groove 63b. Spring 65 biases fork 63 leftward so that pressure pin 64a is fitted to a deepest end of cam groove 63b, thereby locating differential locking slider 62 at a differential unlocking position as a limit position of the leftward slide thereof in the differential unlocking direction, where pawls 62a are removed from respective slots 51c. Therefore, bull gear 51 is free from differential locking slider 62 so as to allow left axle 2L with first differential side gear 53 fixed thereon to rotate relative to bull gear 51 and right axle 2R with second differential side gear 54 fixed thereon.

When the differential locking manipulator is operated for differential locking of axles 2R and 2L, differential locking arm 67 and fork shaft 64 are rotated so that pressure pin 64a is rotated circumferentially of fork shaft 64 while spring 65 presses the leftwardly open V-shaped edge of cam groove 63b against pressure pin 65a. During the rotation of fork shaft 64, fork shaft 64 is unmovable in the axial direction thereof. Therefore, as fork shaft 64 rotates together with pressure pin 64a, pressure pin 64a moves along the edge of cam groove 63b from the deepest end of cam groove 63b to a shallower portion of cam groove 63b, thereby thrusting boss 63a of fork 63 rightward against spring 65. Accordingly, fork 63 moves rightward together with differential locking slider 62, so that differential locking slider 62 is slid along circumferential portion 61b of cylindrical part 61 in the differential locking direction to bull gear 51. Finally, boss 63a comes to abut against stopper ring 66 so that differential locking slider 62 reaches a differential locking position as a limit position of the rightward slide thereof in the differential locking direction, where pawls 62a are inserted into respective slots 51c. Therefore, bull gear 51 is locked with first differential side gear 53 fixed on left axle 2L, so that second differential side gear 54 fixed on right axle 2R is also locked with first differential side gear 53 via differential pinions 52, thereby locking axles 2R and 2L to each other so as to prevent axles 2R and 2L from rotating differentially.

The significant advantage of differential locking mechanism 6 is the minimization of the rear portion of gear chamber 10b incorporating differential locking mechanism 6 including differential gear unit 5 in the axial direction of axles 2R and 2L. In this regard, an inside surface of right vertical wall 12a of lower housing 12 adjacent to the distal right end of second differential side gear 54 provided with no cylindrical part 61 is spaced from the right end surface of bull gear 51 by only an axial length of second differential side gear 54 from the proximal left end thereof to the distal right end thereof. First differential side gear 53, even provided with cylindrical part 61 having differential locking slider 62 fitted thereon, has an axial length from its proximal right end to its distal left end, which is equal to the axial length of second differential side gear 54 provided with no cylindrical part 61, because cylindrical part 61 is joined at only its distal left end to the distal left end of first differential side gear 53 so as to need no additional space on the distal leftward side of the distal left end of first differential side gear 53. As a result, an inside surface of left vertical wall 12b of lower housing 12 is adjoined to the distal left end of first differential side gear 53 so as to be spaced from the left end surface of bull gear 51 as much as second differential side gear 54 spaced from the right end surface of bull gear 51. Therefore, transaxle casing 10 does not have to be modified to expand the rear portion of gear chamber 10b leftward along left axle 2L so as to accommodate differential locking mechanism 6 including differential gear unit 5.

Similar to right and left vertical walls 12a and 12b of lower housing 12, right and left sides 11a2 and 11a3 of an upward convex left rear portion 11a1 of center portion 11a of upper housing 11 defining right and left sides of an upper half of the rear portion of gear chamber 10b incorporating an upper half of differential locking mechanism 6 including differential gear unit 5 are disposed at the axially distal ends of respective first and second differential side gears 53 and 54, and are formed in vertical thin plate-like shapes. Therefore, vertical thin plate-shaped right side 11a2 is square with a right rear portion 11a4 of center portion 11a of upper housing 11, which is extended rightward from a bottom portion of right side 11a2 to support right axle 2R. Also, vertical thin plate-shaped left side 11a3 is square with left axle support portion 11c of upper housing 11 extended leftward from a bottom portion of left side 11a3.

Incidentally, to journal proximal portions of axles 2R and 2L in transaxle casing 10, a bush 21 is fitted on right axle 2R on the distal rightward side of second differential side gear 54, and a bush 22 is fitted on left axle 2L on the distal leftward side of first differential side gear 53. Bushes 21 and 22 are fitted at lower halves thereof in lower semicircular recesses formed on top portions of respective right and left vertical walls 12a and 12b, and are fitted at upper halves thereof in upper semicircular recesses formed on the bottom portions of respective right and left sides 11a2 and 11a3, whereby axles 2R and 2L are clamped between upper and lower housings 11 and 12 via bushes 21 and 22. However, bushes 21 and 22 are radially narrow so as not to seriously expand portions of transaxle casing 10 therearound. Therefore, the square corners between right side 11a2 of left rear portion 11a1 of center portion 11a and right rear portion 11a4 of center portion 11a and between left side 11a3 of left rear portion 11a1 of center portion 11a and left axle support portion 11c are kept from being broken by expansion of the bottom portions of right and left sides 11a2 and 11a3 accommodating the upper halves of bushes 21 and 22.

Especially, the square corner between right side 11a2 of left rear portion 11a1 of center portion 11a and right rear portion 11a4 of center portion 11a is advantageous for mounting a rectangular fluid reservoir 25 on right rear portion 11a4 of center portion 11a of upper housing 11. Right rear portion 11a4 of center portion 11a of upper housing 11 is vertically thin because it only surrounds right axle 2R, and extended laterally along right axle 2R continuously to right axle support portion 11b. Further, as mentioned above, the rear side of HST chamber 10a disposed at a front end of right rear portion 11a4 of center portion 11a supporting right axle 2R is extended laterally along right axle 2R. The rear side of HST chamber 10a is square with right rear portion 11a4 of center portion 11a similarly to right side 11a2 of left rear portion 11a1 of center portion 11a. Therefore, rectangular fluid reservoir 25 for reserving fluid used as hydraulic fluid for HST 3 and as lubricating fluid for transaxle 1 is mounted on right rear portion 11a4 of center portion 11a (and right axle support portion 11b) of upper housing 11 of transaxle casing 10 so as to be adjacent at a left end thereof to right side 11a2 of left rear portion 11a1 of center portion 11a of upper housing 11, and so as to be adjacent at a front end thereof to a wall portion of center portion 11a of upper housing 11 defining the rear side of HST chamber 10a.

Upwardly convex left rear portion 11a1 of center portion 11a of upper housing 11 is formed with an upwardly open port 11a5 above the rear portion of gear chamber 10b therein incorporating differential locking mechanism 6 including differential gear unit 5. An orifice 25a is extended leftward from fluid reservoir 25 mounted rightward from left rear portion 11a1 of center portion 11a, and is bent downward so as to be fitted into port 11a5. Orifice 25a serves as a siphon in fluid reservoir 25. Therefore, fluid is siphoned from fluid reservoir 25 into gear chamber 10b via orifice 25a so as to be supplied as lubricating fluid for gears and other members in gear chamber 10b.

Further, fluid reservoir 25 is provided on a rightward top portion thereof (laterally opposite orifice 25a) with a fluid-feeding hole covered with a cap 25b. Fluid reservoir 25 is provided with a breather hole 25c adjacent to the fluid-feeding hole, however, at a position where fluid fed into fluid reservoir 25 via the fluid-feeding hole is prevented from leaking via breather hole 25c. In this regard, an outer wall of fluid reservoir 25 is formed with a vertical portion extended upward from a bottom portion thereof so as to define a vertical recess 25d open at the bottom portion of fluid reservoir 25 to the atmosphere. A top portion of the outer wall of fluid reservoir 25 defining vertical recess 25d is disposed immediately under the top portion of fluid reservoir 25, and is provided with breather hole 25c communicating an inside space of fluid reservoir 25 to an outside space of fluid reservoir 25 in recess 25d. Therefore, air is breathed out from breather hole 25c to the atmosphere via the space in vertical recess 25d.

As mentioned above, first differential side gear 53 provided with cylindrical part 61 is equal in the axial length thereof to second differential side gear 54 provided with no cylindrical part 61, so that the rightward space in the rear portion of gear chamber 10b from the right end surface of bull gear 51 to right side 11a2 of upper housing 11 and right vertical wall 12a of lower housing 12 is equal in volume to the leftward space in the rear portion of gear chamber 10b from the left end surface of bull gear 51 to left side 11a3 of upper housing 11 and left vertical wall 12b, except that a front right portion of the rear portion of gear chamber 10b incorporating differential gear unit 5 is narrowed by a left rear corner of HST chamber 10a. Therefore, the right differential side gear fixed on right axle 2R may serve as first differential side gear 53 provided with cylindrical part 61 without requiring axially rightward expansion of the rear portion of gear chamber 10b (narrowing the space for mounting fluid reservoir 25 on right rear portion 11a4 of upper housing 11), except that is should be considered the right front portion of the rear portion of gear chamber 10b needs to be expanded to ensure a space for arranging front portions of cylindrical part 61 and differential locking slider 62.

Figure 2:
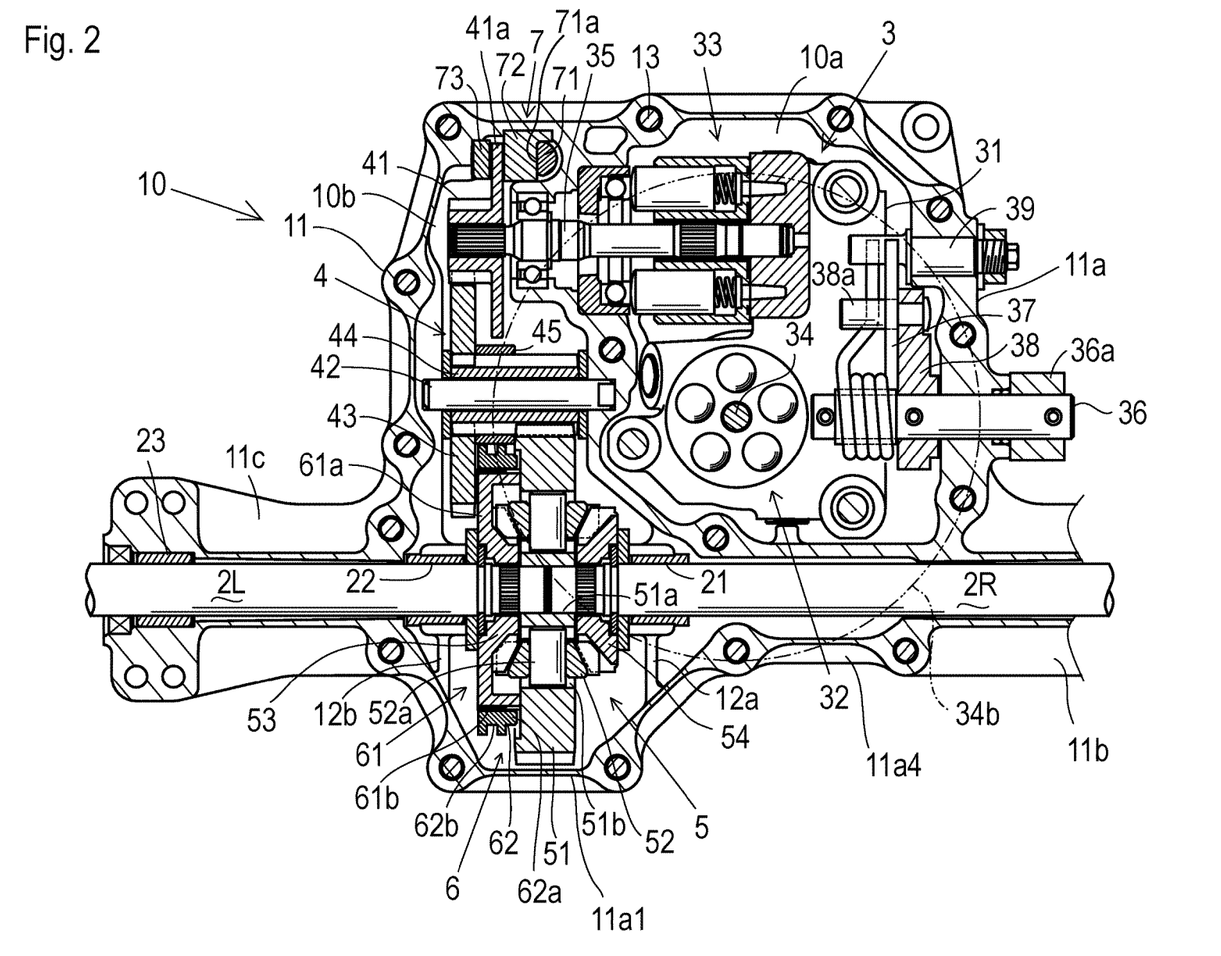
FIG. 2 is a sectional plan view of the transaxle.
Figure 3:
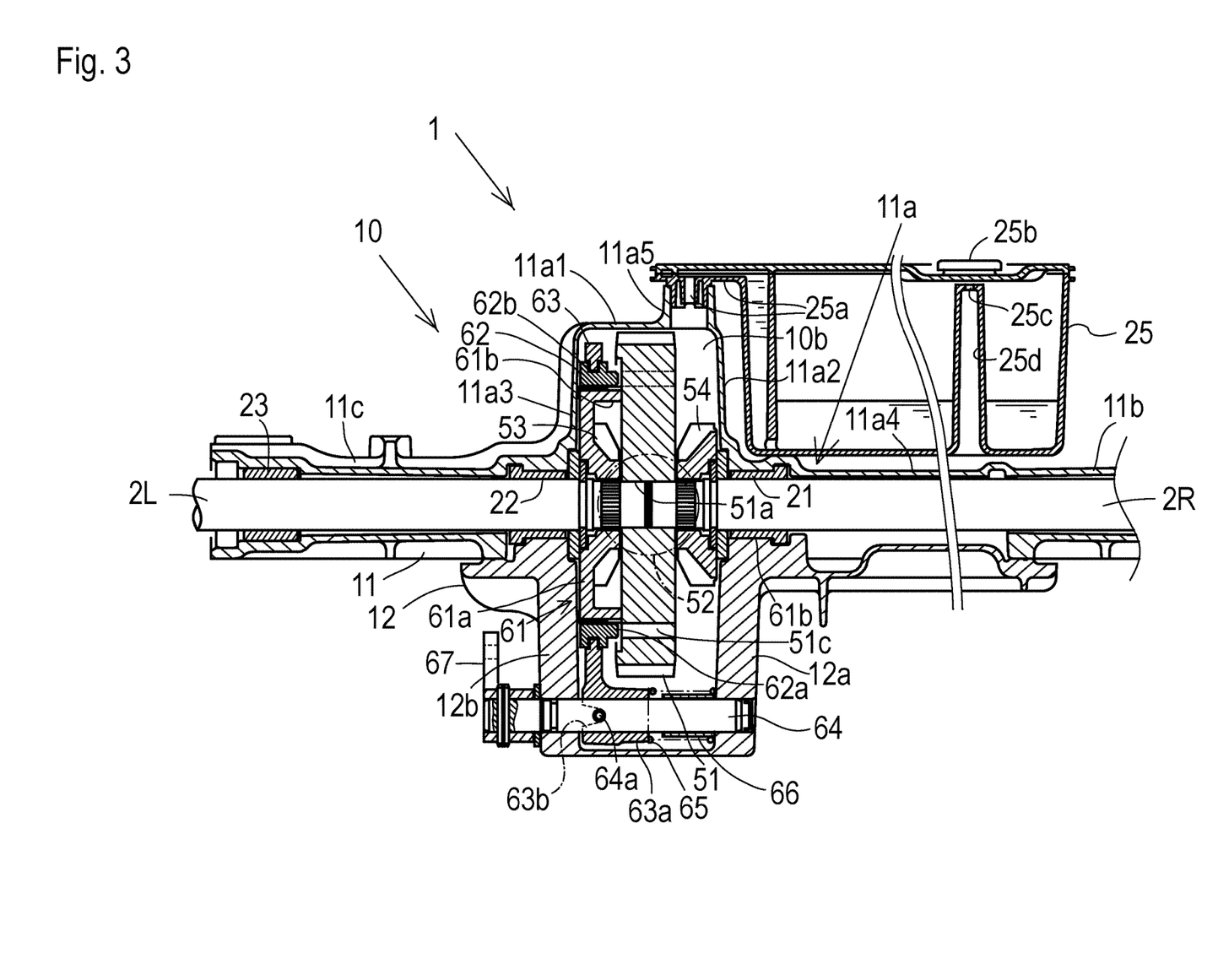
FIG. 3 is a sectional rear view of the transaxle showing a differential locking mechanism.
Figure 4:
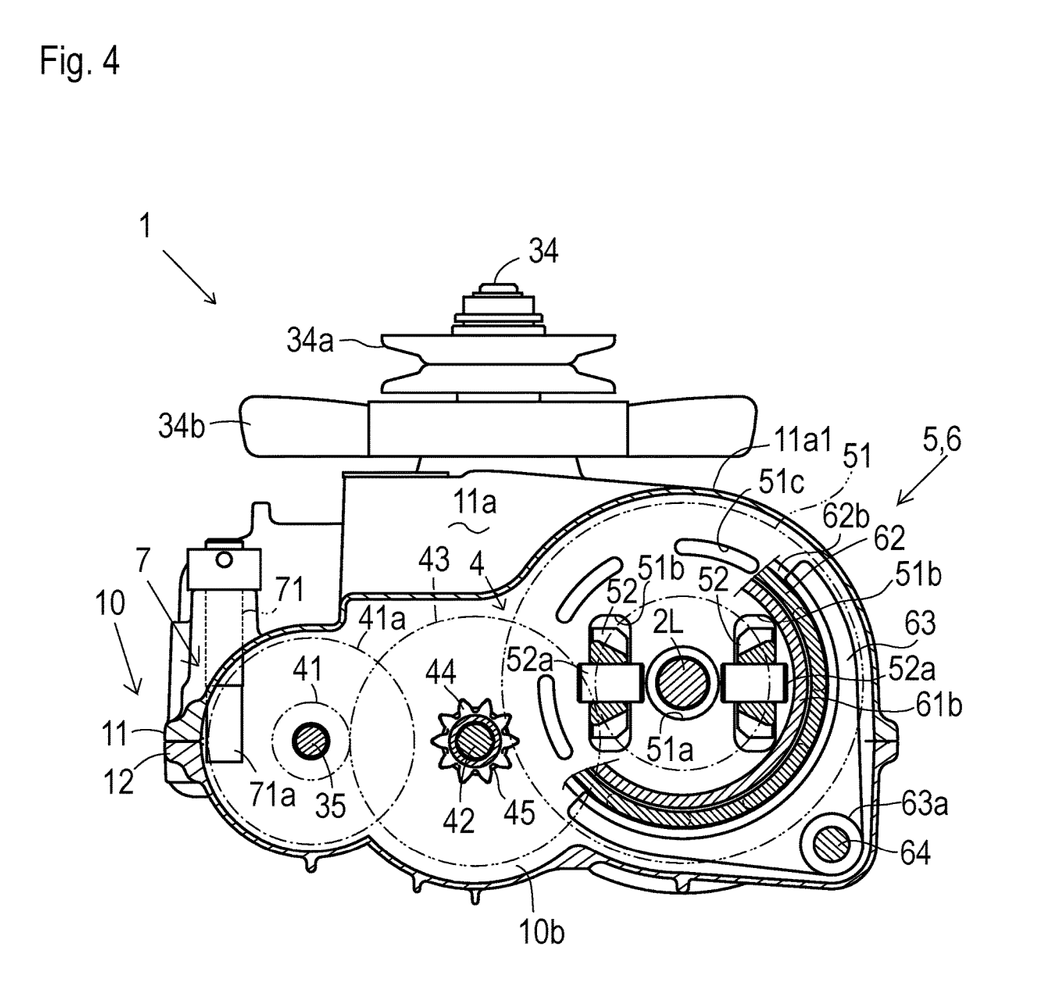
FIG. 4 is a sectional side view of the transaxle showing the differential locking mechanism.

In the above-mentioned embodiment shown in FIGS. 2 to 4, cylindrical part 61 is joined at the distal end thereof to the distal end of first differential side gear 53 because cylindrical part 61 is formed integrally with first differential side gear 53. In other words, the distal end portion of first differential side gear 53 is extended centrifugally so as to form vertical plate portion 61a of cylindrical part 61, and is bent rightward to extend toward bull gear 51 so as to form circumferential portion 61b of cylindrical part 61. Therefore, first differential side gear 53 and cylindrical part 61 are made of the same material. Since differential locking slider 62 is spline-fitted on circumferential portion 61b of cylindrical part 61, first differential side gear 53 and cylindrical part 61 are made of steel to ensure a strength of cylindrical part 61 supporting differential locking slider 62. On the other hand, second differential side gear 54 and symmetric differential pinions 52 are made of powder metal for reducing costs.

Figure 5:
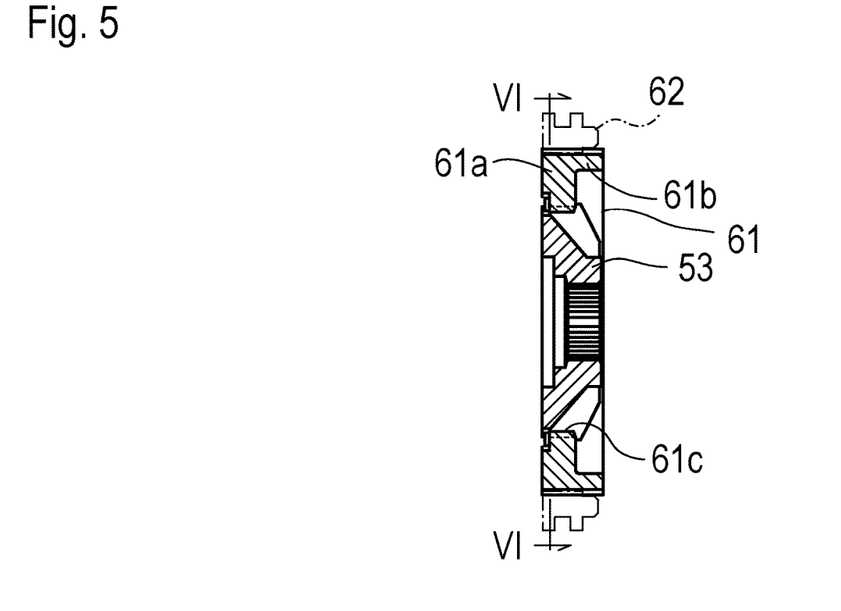
FIG. 5 is a sectional side view of a differential side gear, a cylindrical member, and a differential locking slider for an alternative differential locking mechanism.
Figure 6:
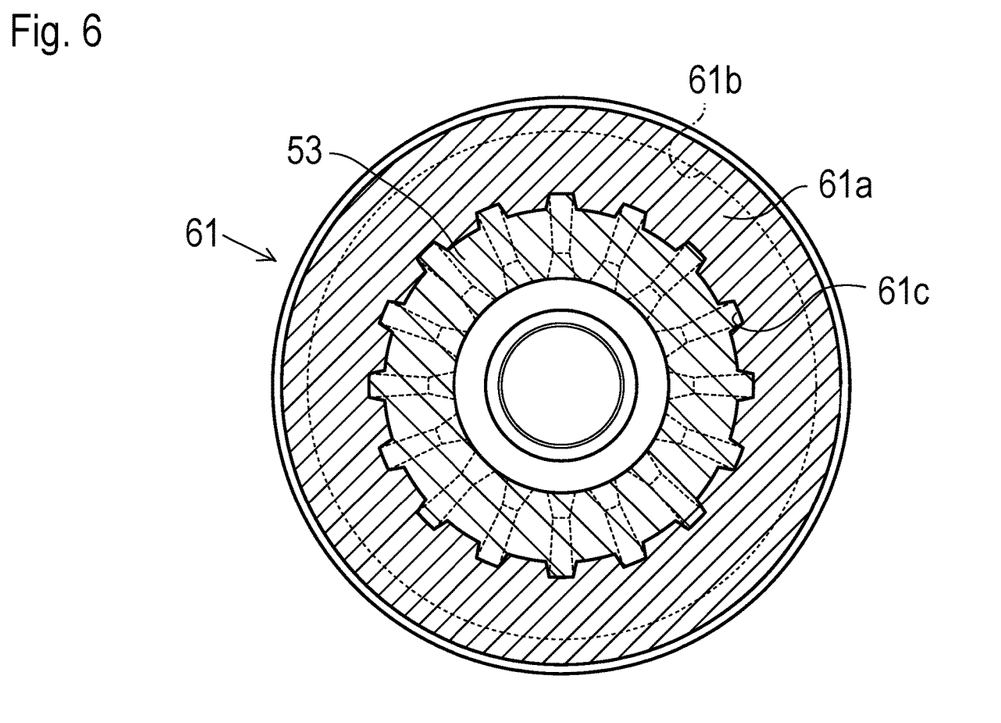
FIG. 6 is a cross sectional view taken along VI-VI line of FIG. 5.

Referring to FIGS. 5 and 6, in an alternative embodiment, cylindrical part 61 is a member separated from first differential side gear 53. Vertical plate portion 61a of cylindrical part 61 is formed at an inner circumferential edge thereof with notches in correspondence to the shape of gear teeth of the distal end portion of first differential side gear 53. To join the axial distal end portion of cylindrical part 61 to the axially distal end portion of first differential side gear 53, the gear teeth of first differential side gear 53 are fitted at the axially distal end thereof to the respective notches on the inner circumferential edge of vertical plate portion 61a of cylindrical part 61, thereby making cylindrical part 61 unrotatable relative to first differential side gear 53. To surely fix cylindrical part 61 to first differential side gear 53, the inner circumferential edge of vertical plate portion 61a of cylindrical part 61 may be joined to the axially distal end portion of first differential side gear 53 by welding or by additional fastening member, e.g., a pin or a bolt.

In the embodiment of FIGS. 5 and 6, only cylindrical part 61 is made of steel to ensure the required strength of circumferential portion 61b for supporting differential locking slider 62 fitted thereon. First differential side gear 53 can be a gear identical to second differential side gear 54. In other words, a common gear formed as a differential side gear can be used as either first differential side gear 53, if cylindrical part 61 is fixed thereon, or second differential side gear 54, if it is not provided with cylindrical part 61. Therefore, the common differential side gear is made of economic powder metal for providing both first and second differential side gears 53 and 54 made of powder metal. Similarly, a common gear formed as a differential pinion is made of economic powder metal for providing both symmetric differential pinions 52 made of powder metal.

It is further understood by those skilled in the art that the foregoing description is given to preferred embodiments of the disclosed apparatus and that various changes and modifications may be made in the invention without departing from the scope thereof defined by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A transaxle comprising:
   a hydrostatic continuously variable transmission;
   at least one axle;
   a gear train for drivingly connecting the hydrostatic continuously variable transmission and the axle;
   a housing accommodating the hydrostatic continuously variable transmission, the axle, the gear train and storing an oil therein; and
   a reservoir tank connected to the housing so that the oil in the housing can be moved back and forth,
   wherein the reservoir tank has a rectangular parallelepiped shape and is disposed on a side of a final reduction bull gear included in the gear train and above the axle along an axis direction of the axle,
   wherein the housing includes a port opened at an upper surface of the housing to directly mount the reservoir tank,
   wherein the reservoir tank is connected to the port via an orifice, and
   wherein the reservoir tank includes a siphon constituted with the orifice.

2. The transaxle according to claim 1,
   wherein the housing includes a first surface portion that is substantially parallel to the axis direction of the axle and a second surface portion that is substantially perpendicular to the axis, wherein the first surface portion and the second surface portion form a part of a tank mounting region where the reservoir tank is to be disposed, the tank mounting region being formed in a recessed shape,
   wherein the tank mounting region is formed in a substantially rectangular shape in which the first surface portion is substantially parallel to the axis and the second surface portion is substantially perpendicular to the axis when being viewed from a direction perpendicular to an upper surface of the housing, and
   wherein the reservoir tank is disposed on the tank mounting region with longer sides of the reservoir tank directed to be parallel to the axis.

3. The transaxle according to claim 2,
   wherein the reservoir tank includes a recess formed by denting a bottom surface of the reservoir tank toward an upper surface of the reservoir tank such that a weir-shaped portion is erected inside the reservoir tank, and
   wherein the reservoir tank is separated by the recess into a first tank part located closer to a first axle and a second tank part located closer to a second axle, in an axial direction of the first and second axles.

4. The transaxle according to claim 3,
wherein the reservoir tank includes a fluid supply hole formed in the upper surface located above the recess to supply fluid to the first tank part and the second tank part.

5. The transaxle according to claim 4,
wherein the reservoir tank includes a breather hole formed in a top portion of the recess at a position not overlapping with the fluid supply hole when being viewed in a plan view, the breather hole communicating an inside space of the reservoir tank to an outside space of the reservoir tank.

6. The transaxle according to claim 1,
wherein the housing supports a second axle on the same axis with respect to the axle,
wherein the transaxle includes a differential gear for distributing a power transmitted to the final reduction bull gear to the axle and the second axle, and a differential locking mechanism for connecting the axle and the second axle via the differential gear, and
wherein the differential locking mechanism is provided in the final reduction bull gear at a position opposite to the reservoir tank.

7. A transaxle comprising:
a hydrostatic continuously variable transmission;
at least one axle;
a gear train for drivingly connecting the hydrostatic continuously variable transmission and the axle;
a housing accommodating the hydrostatic continuously variable transmission, the axle, the gear train and storing an oil therein; and
a reservoir tank connected to the housing so that the oil in the housing can be moved back and forth,
wherein the reservoir tank has a rectangular parallelepiped shape and is disposed on a side of a final reduction bull gear included in the gear train and above the axle along an axis direction of the axle,
wherein the housing includes a first surface portion that is substantially parallel to the axis direction of the axle and a second surface portion that is substantially perpendicular to the axis,
wherein the first surface portion and the second surface portion form a part of a tank mounting region where the reservoir tank is to be disposed, the tank mounting region being formed in a recessed shape,
wherein the tank mounting region is formed in a substantially rectangular shape in which the first surface portion is substantially parallel to the axis and the second surface portion is substantially perpendicular to the axis when being viewed from a direction perpendicular to an upper surface of the housing, and
wherein the reservoir tank is disposed on the tank mounting region with longer sides of the reservoir tank directed to be parallel to the axis.

8. The transaxle according to claim 7,
wherein the reservoir tank includes a recess formed by denting a bottom surface of the reservoir tank toward an upper surface of the reservoir tank such that a weir-shaped portion is erected inside the reservoir tank, and
wherein the reservoir tank is separated by the recess into a first tank part located closer to a first axle and a second tank part located closer to a second axle, in an axial direction of the first and second axles.

9. The transaxle according to claim 8,
wherein the reservoir tank includes a fluid supply hole formed in the upper surface located above the recess to supply fluid to the first tank part and the second tank part.

10. The transaxle according to claim 9,
wherein the reservoir tank includes a breather hole formed in a top portion of the recess at a position not overlapping with the fluid supply hole when being viewed in a plan view, the breather hole communicating an inside space of the reservoir tank to an outside space of the reservoir tank.

11. The transaxle according to claim 7,
wherein the housing supports a second axle on the same axis with respect to the axle,
wherein the transaxle includes a differential gear for distributing a power transmitted to the final reduction bull gear to the axle and the second axle, and a differential locking mechanism for connecting the axle and the second axle via the differential gear, and
wherein the differential locking mechanism is provided in the final reduction bull gear at a position opposite to the reservoir tank.

* * * * *